United States Patent [19]
Tanaka et al.

[11] Patent Number: 5,548,476
[45] Date of Patent: Aug. 20, 1996

[54] RECEIVING AND TRANSFORMING APPARATUS

[75] Inventors: Toyokazu Tanaka; Manabu Takamoto, both of Hitachi; Satoshi Miwada, Naka-gun; Noriyuki Tetsu; Sadao Waizumi, both of Hitachi, all of Japan

[73] Assignee: Hitachi, Ltd., Tokyo, Japan

[21] Appl. No.: 431,566

[22] Filed: Apr. 27, 1995

Related U.S. Application Data

[63] Continuation of Ser. No. 79,798, Jun. 23, 1993, Pat. No. 5,450,281, which is a continuation-in-part of Ser. No. 935,405, Aug. 26, 1992, abandoned.

[30] Foreign Application Priority Data

Aug. 28, 1991 [JP] Japan ................................ 3-216885

[51] Int. Cl.$^6$ ............................................. H02B 1/20
[52] U.S. Cl. .................................................. 361/611
[58] Field of Search .......................... 361/602–605, 361/611–612, 618, 620–621, 624, 637–640, 648

[56] References Cited

FOREIGN PATENT DOCUMENTS 1303002  6/1989  Japan ................................ 361/605

Primary Examiner—Gregory D. Thompson
Attorney, Agent, or Firm—Antonelli, Terry, Stout & Kraus

[57] ABSTRACT

A high voltage power receiving and transforming apparatus for consumer demands receiving power from two lines and supplying the power to respective transformers through instrument potential and current transformers. First circuit breakers at a primary side of the transformers, are arranged at both sides of the instrument potential and current transformers, second circuit breakers, at a receiving side, are arranged at both sides of said first circuit breakers. The circuit breakers and receiving portion connecting portion to the transformers, and the instrument potential and current transformer are connected by a duct line connection portion at a backside of the circuit breakers.

18 Claims, 15 Drawing Sheets

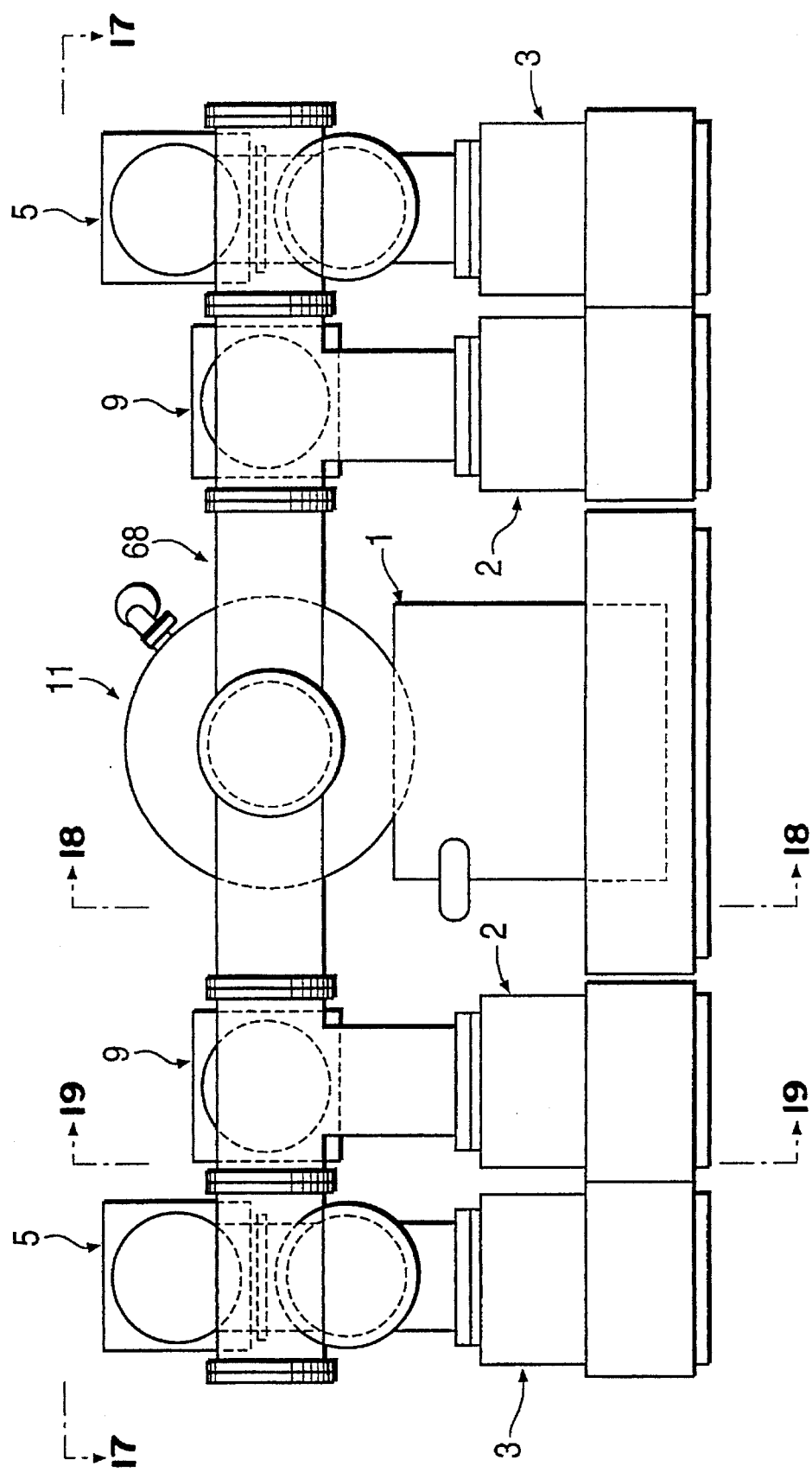

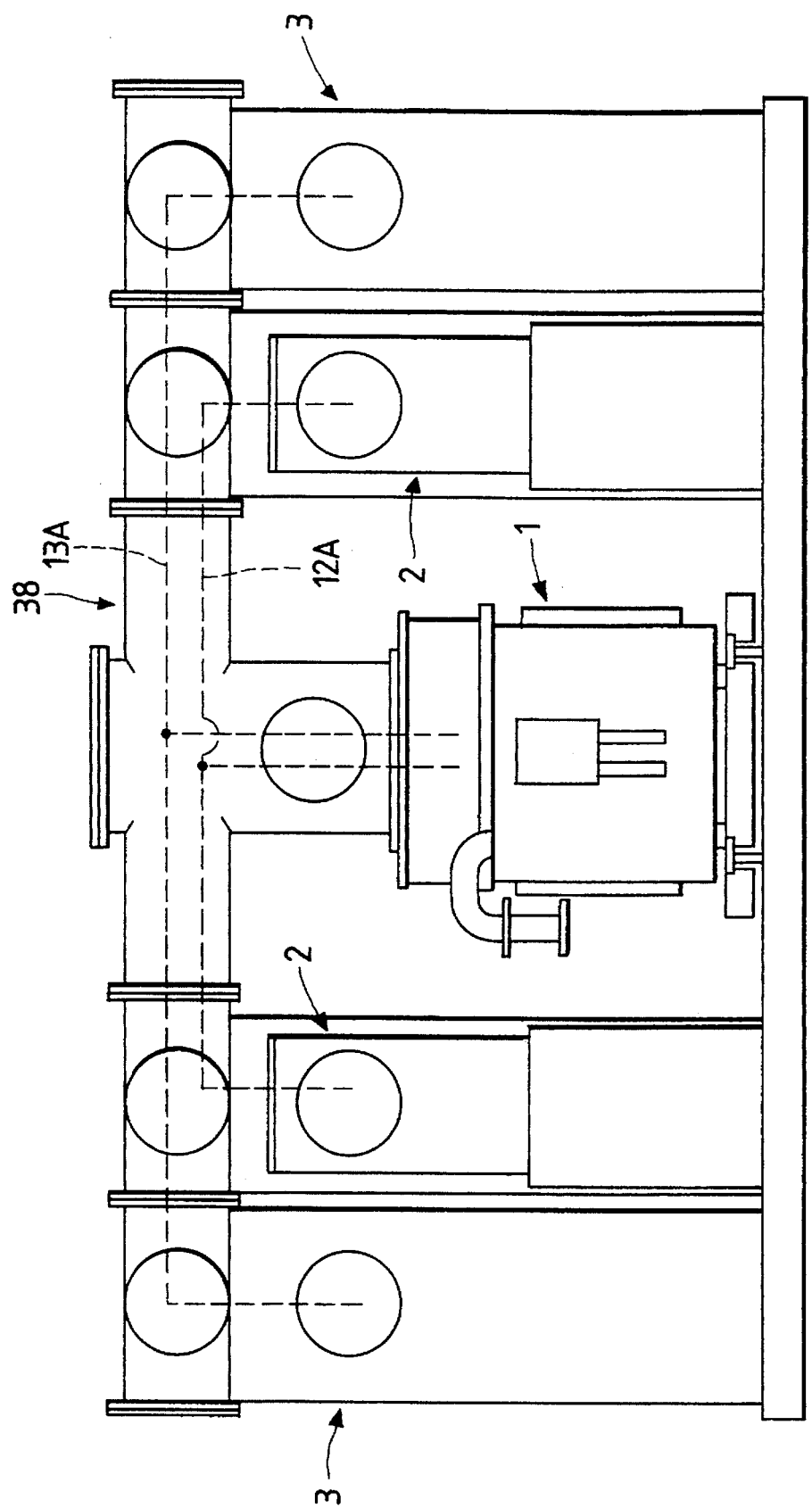

5,548,476

RECEIVING AND TRANSFORMING APPARATUS

CROSS REFERENCE TO RELATED APPLICATION

This is a continuation application of U.S. Ser. No. 08/079,798, filed Jun. 23, 1993 now U.S. Pat. No. 5,750,281 continuation-in-part application of U.S. Ser. No. 07/935,405, filed Aug. 26, 1992 (now abandoned).

FIELD OF THE INVENTION

The present invention relates to a receiving and transforming apparatus and, more particularly, to a gas insulated switch gear in high voltage receiving and transforming facilities for consumer demand.

BACKGROUND OF THE INVENTION

In, for example, U.S. Pat. Nos. 4,821,141 and 5,126,917, high voltage receiving and transforming apparatus are proposed, with such apparatus being utilized for an electric power company which does not need not to measure the supplied power.

On the other hand, consumer demands require high voltage receiving and transforming apparatus which are generally provided with a two line receiving portion, an instrument potential and current transformer (MOF) for measuring supply power, and two power transformers for receiving the measured supplied power, and a so-called two line receiving 1 MOF 2 bank type receiving and transforming systems are generally employed.

In, for example, JP-A-1-303002, a consumer demand receiving and transforming apparatus is proposed aimed at reducing the installation site or area.

A disadvantage of the last proposed receiving and transforming apparatus resides in the fact that circuit breakers at the power transformer site are utilized and, consequently, the apparatus must stop or interrupt the supplying of power by opening the circuit breakers at the receiving side in response to a receipt of a fault signal. Thus, all consumers of a public utility or electric power company experience a power failure thereby adversely affecting the reliability of the power supply.

In an attempt to resolve the above-described problem, it has been proposed to provide a receiving and transforming system wherein circuit breakers are installed at a primary side of each power transformer; however, a disadvantage of this proposal resides in the fact that, by virtue of the proposed receiving and transforming system, with the circuit breakers being installed at the primary side of the power transformers, the overall installation site is increased, and it is necessary to disassemble the system to the various components thereof in order to enable a transportation to the installation site.

SUMMARY OF THE INVENTION

An object of the present invention resides in providing a receiving and transforming apparatus having high power supply reliability and which is transportable without the disassembling even for the two line receiving 2 bank type receiving and transforming apparatus for public utilities.

In order to realize the above described object, a receiving and transforming apparatus wherein the power is received through the two lines and the power supplied to each power transformer through instrument potential and current transformers wherein the first circuit breakers, disposed at the primary side of the power transformer, are arranged at both sides of the instrument potential and current transformer, the second circuit breakers, disposed at a line receiving side, being arranged at outer sides of the first circuit breakers. The first or second circuit breakers are connected with a receiving portion, with the connecting portion of the power transformer, and the instrument potential and current transformers being connected to a back side of the first and second breakers by a duct line connecting portion.

In accordance with the receiving and transforming apparatus of the present invention, the power transformer caused failure is separated from the receiving side by the first circuit breaker furnished to the primary side of the power transformer and the power failure only affects the customers connecting to the failed power transformer. Thus, the effects of the above noted fault of the power transformer can be isolated to the smallest possible consumer area. Moreover, the size of the receiving and transforming apparatus may be within allowable limit dimensions for transportation even though circuit breakers at the line receiving side and primary side of the power transformer were installed at both sides of the instrument potential and current transformer and transportation by, for example, a truck or trailer, without disassembling the components of the apparatus, is possible.

BRIEF DESCRIPTION OF THE DRAWINGS

These and other objects, features and advantages of the present invention will become more apparent from the following description when taken in connection with the accompanying drawings which show, for the purpose of illustration only, several embodiments in accordance with the present invention, wherein:

FIG. 16 is a plan view of another embodiment of an apparatus constructed in accordance with the present invention;

FIG. 17 is a view taken in the direction of the line XVII—XVII in FIG. 16;

DETAILED DESCRIPTION

Figure 1:
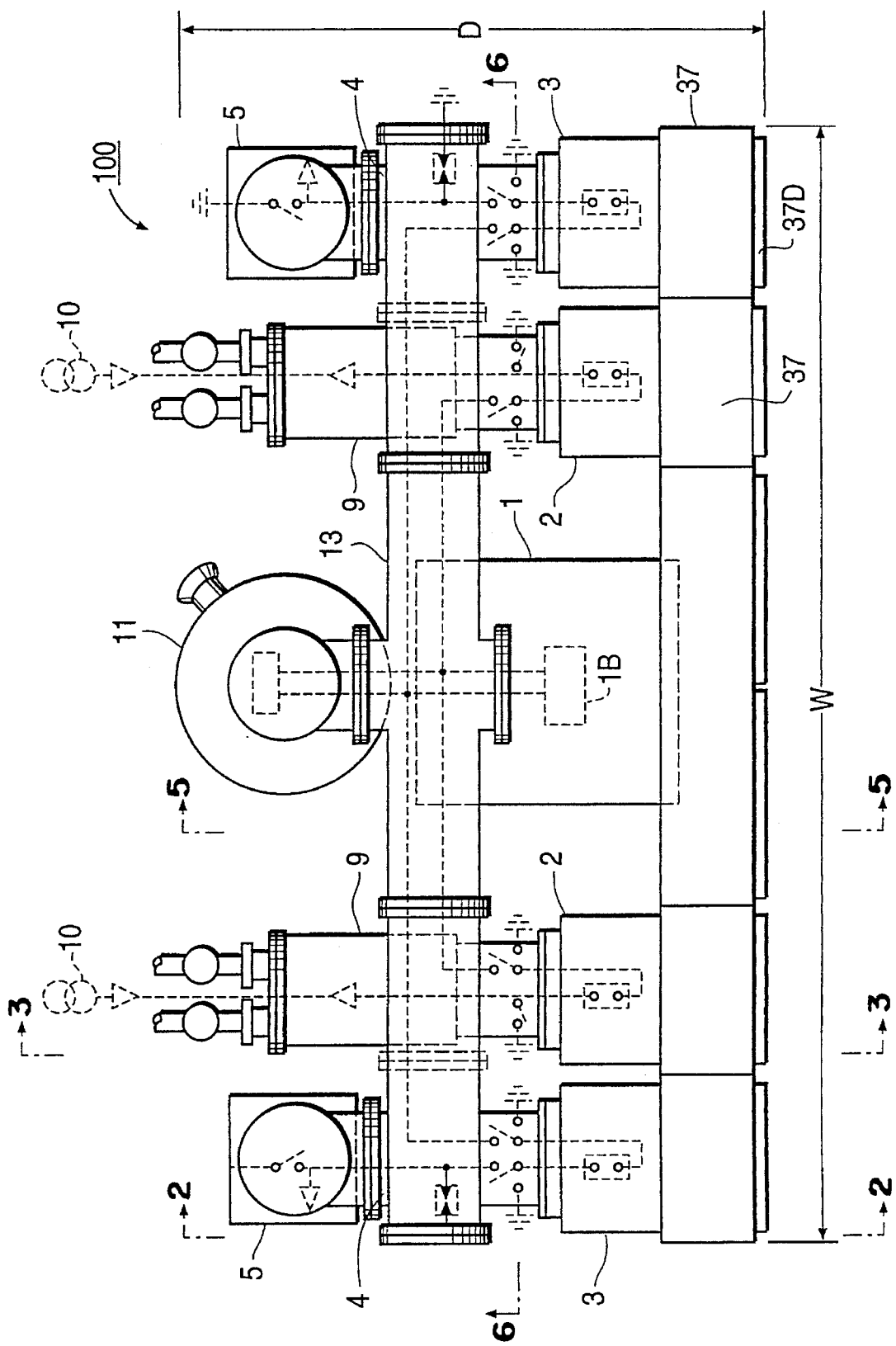
FIG. 1 is a plan view of a receiving and transforming apparatus constructed in accordance with the present invention.
Figure 2:
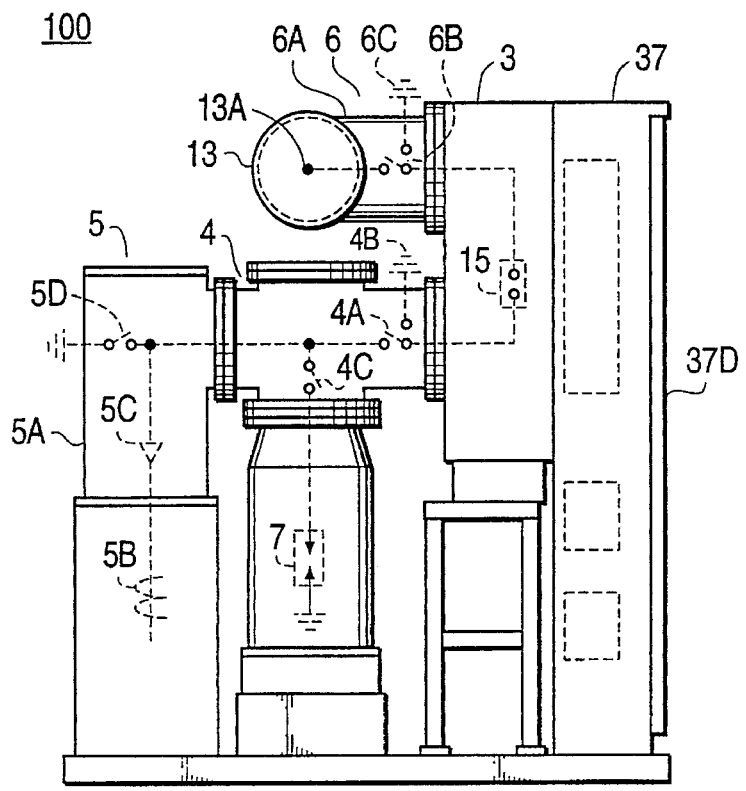
FIG. 2 is a cross-sectional view taken along the line II—II in FIG. 1.
Figure 3:
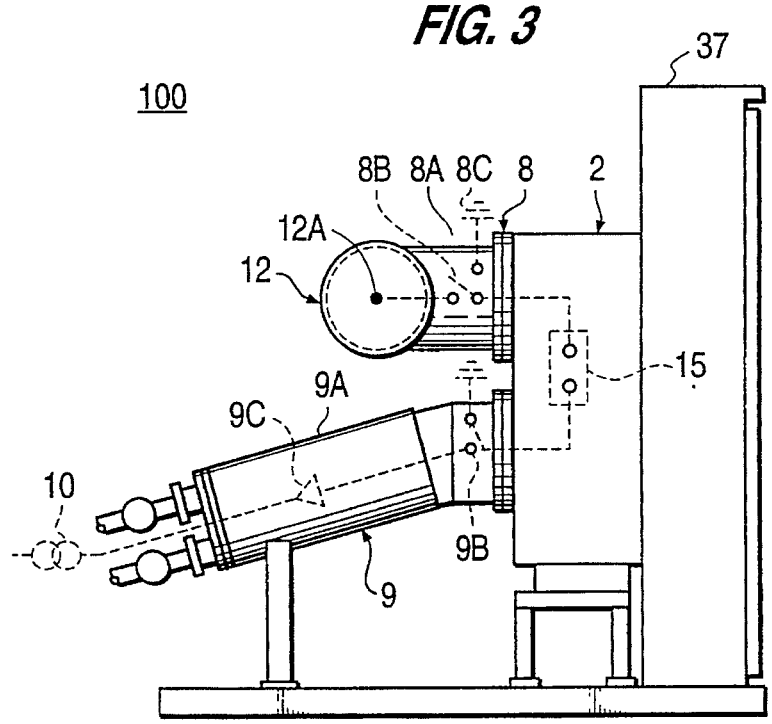
FIG. 3 is a cross-sectional view taken along the line III—III in FIG. 1.
Figure 4:
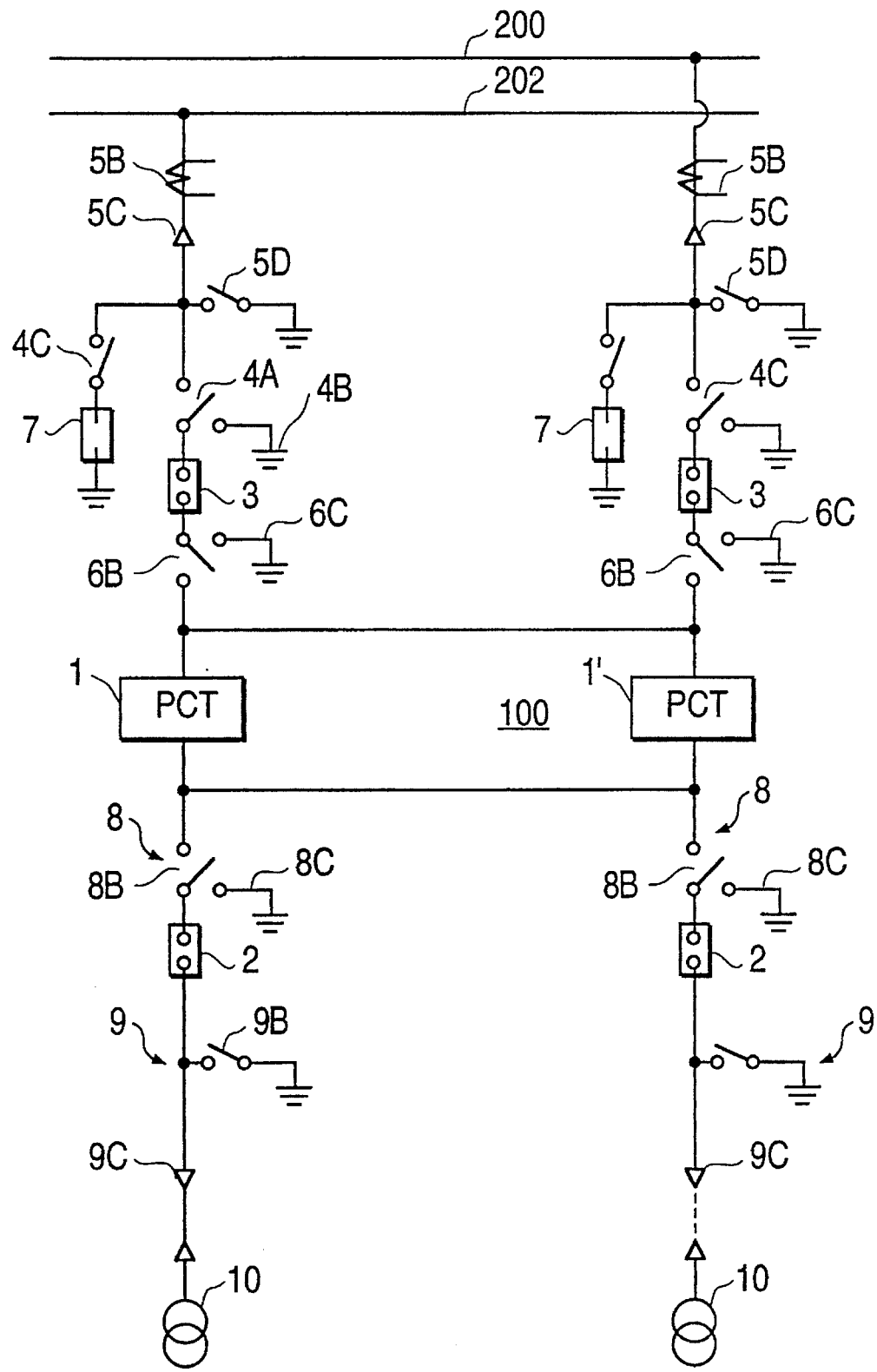
FIG. 4 is a schematic diagram illustrating an electrical interconnection in accordance with the present invention.

Referring now to the drawings wherein like reference numerals are used throughout the various views to designate like parts and, more particularly, to FIGS. 1–6, according to these figures, a receiving and transforming apparatus generally designated by the reference numeral 100 includes an instrument potential and current transformer 1 measuring electric power supplied through two power lines 200, 202 (FIG. 4) at both sides of the instrument potential and current transformer 1, first breakers 2 at the primary side of the power transformers 10 are respectively installed and, at outer sides of the first breakers 2, the second breakers 3 are respectively installed at the receiving side. An input side of the second breakers 3 is connected with the receiving portion 5 (FIGS. 1,2) through a duct line connecting portion 4 provided with an earth switch 4B (FIG. 2) and an arrestor separator 4C in a vessel 4A as shown in FIGS. 2 and 4. The receiving portion 5 is provided with a current transformer 5B, a cable head 5C, and an earth switch 5D in the vessel 5A (FIG. 2). An output side of the respective second breaker 3 is connected to a duct line connecting portion 6 (FIG. 2) provided with a disconnector 6B and an earth switch 6C in a vessel 6A. An arrestor 7 (FIGS. 2, 4) is connected to the arrestor separator 4C in the duct line connecting portion 4.

As shown in FIGS. 3 and 4, the first circuit breaker 2 is connected at an input side with a duct line connecting portion 8 having a vessel 8A (FIGS. 2, 4) and a disconnector 8B as well as an earth switch 8C both of which are installed inside the vessel 8A, and is also connected at an output side with a transformer connecting portion 9 (FIG. 3) having a vessel 9A, and an earth switch 9B and a cable head 9C being installed inside the vessel 9A (FIG. 3). The transformer connecting portion 9 is connected to the power transformer 10.

Figure 5:
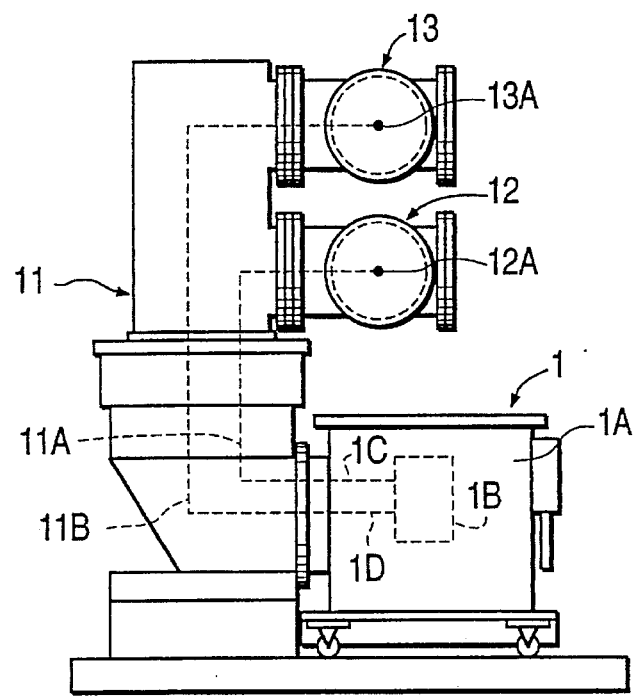
FIG. 5 is a cross-sectional view taken along the line V—V in FIG. 1.

The above described instrument potential and current transformer 1 is, as shown most clearly in FIG. 5, provided with a movable vessel 1A, with a body of the potential current transformer 1B being stored in the vessel 1A, and conductors 1C and 1D which are connected to the body 1B of the potential and current transformer 1. The conductors 1C and 1D are respectively connected to the conductors 11A and 11B of the duct line connecting portion 11. The conductor 11A of the duct line connecting portion 11 is connected to the conductor 12A in a lower duct line connecting portion 12, and the conductor 11B is connected to a conductor 13A in an upper duct line connecting portion 13.

Figure 6:
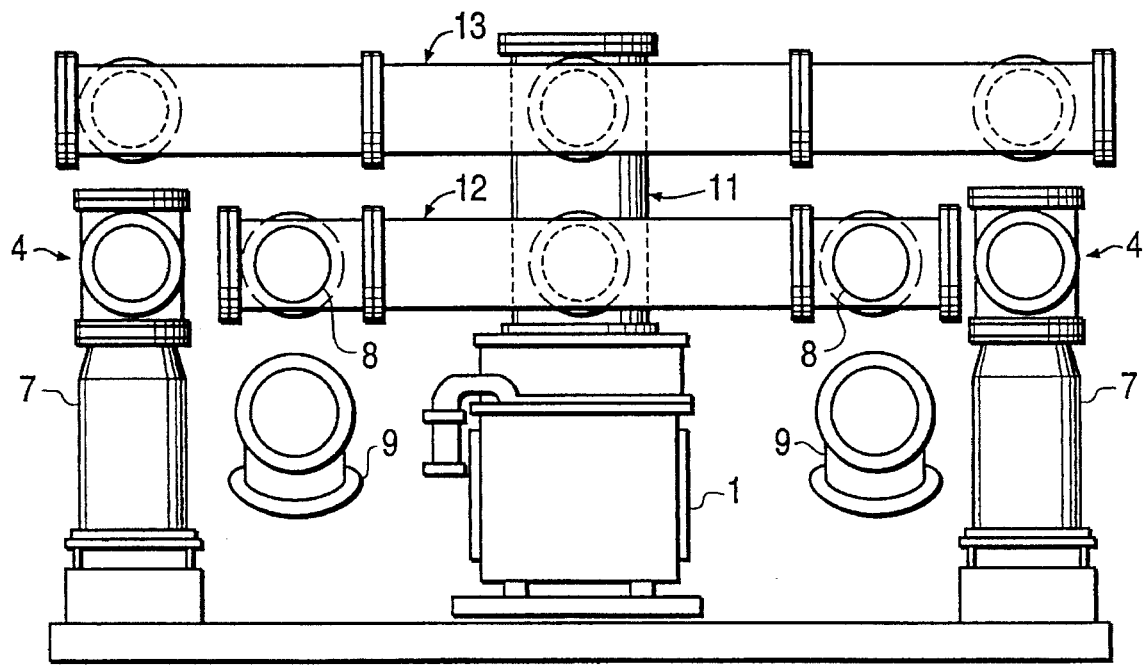
FIG. 6 is a cross-sectional view taken along the line VI—VI in FIG. 1.

The duct line connecting portion 12 is connected, as shown in FIG. 6, to the duct line connecting portion 8 which is connected to the respective first circuit breakers 2, and the duct line connecting portion 13 is connected, as shown in FIG. 1 to the duct line connecting portion 4 which is connected to the respective second circuit breakers 3. The duct line connection portions 12, 13 are arranged in the same plane as most clearly shown in FIG. 5 at back sides of the first circuit breakers 2 and second circuit breakers 3 as shown in FIG. 1. Insulating gas fills the vessels of the above described components. The receiving and transforming apparatus 100 may be reduced in size so as to enable a reduction in the installation area. More particularly, referring to FIG. 1, a width W and a depth D may be reduced to within a size of a transportation allowance by constructing the first circuit breakers 2 and the second circuit breakers 3, installed at opposite sides of the instrument potential and current transformer, in a box-like or cubical configuration. Additionally, the receiving and transforming apparatus 100 can be transported by a truck or trailer without disassembly. Furthermore, maintenance and inspecting of the receiving and transforming apparatus 100 can be facilitated since control panels of the first and second circuit breakers 2, 3 and a plane of withdrawal of the instrument potential and current transformer 1 are arranged in the same plane.

Referring to FIGS. 7–10, the components of the first and second circuit breakers 2, 3 are explained in greater detail.

Figure 7:
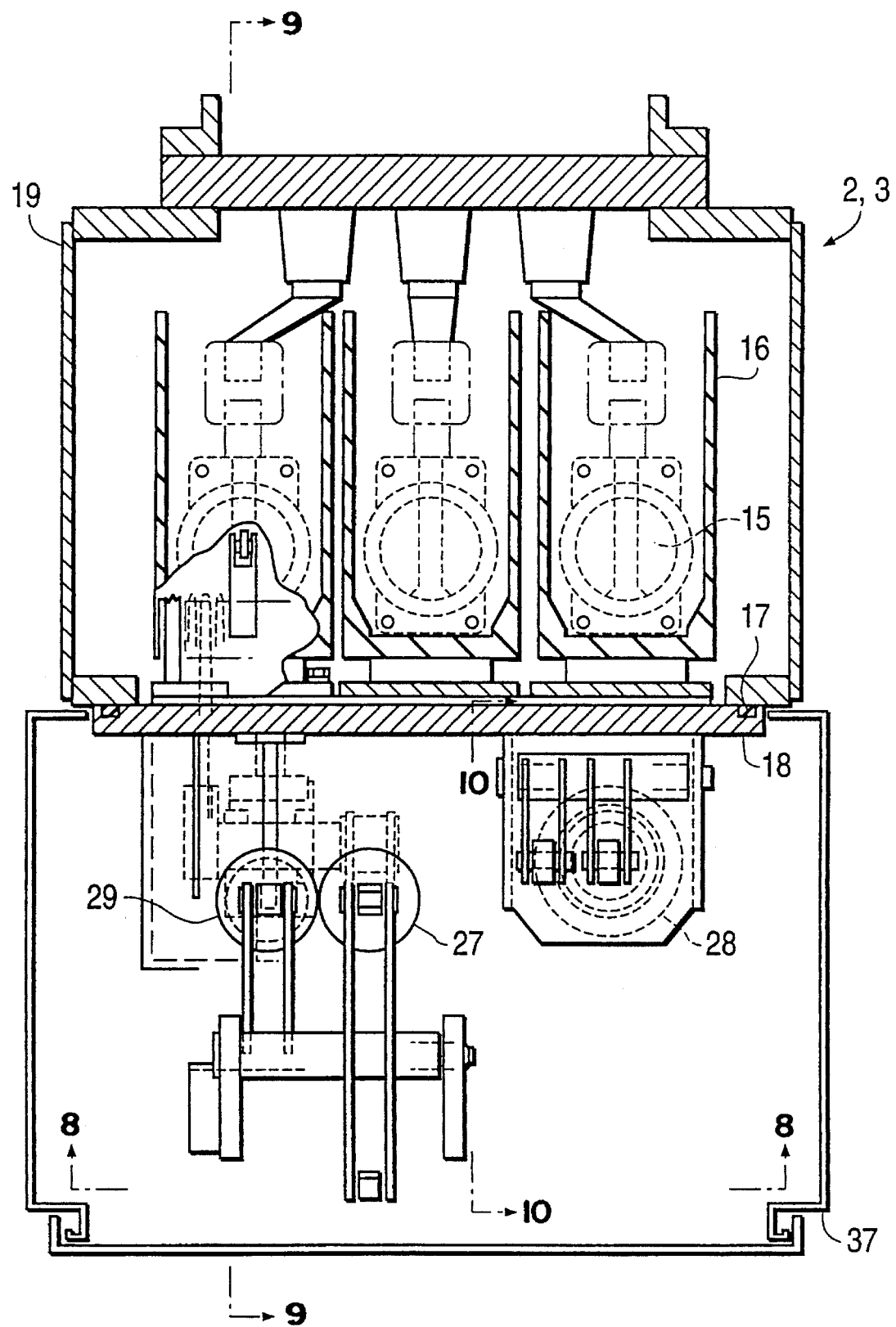
FIG. 7 is a horizontal cross-sectional view of a circuit breaker employed in an apparatus in accordance with the present invention.

Three phases at the interrupting portions 15 of each of the circuit breakers 2, 3 are installed in parallel in a molded insulating case 16 as shown most clearly in FIG. 7. The respective molded insulating casings are supported and fixed to a fitting plate 18, with the fitting plate having an O-ring 17 accommodated along the periphery thereof. The O-ring 17 hermetically seals or encloses an insulating gas in a sealed vessel 19.

Figure 9:
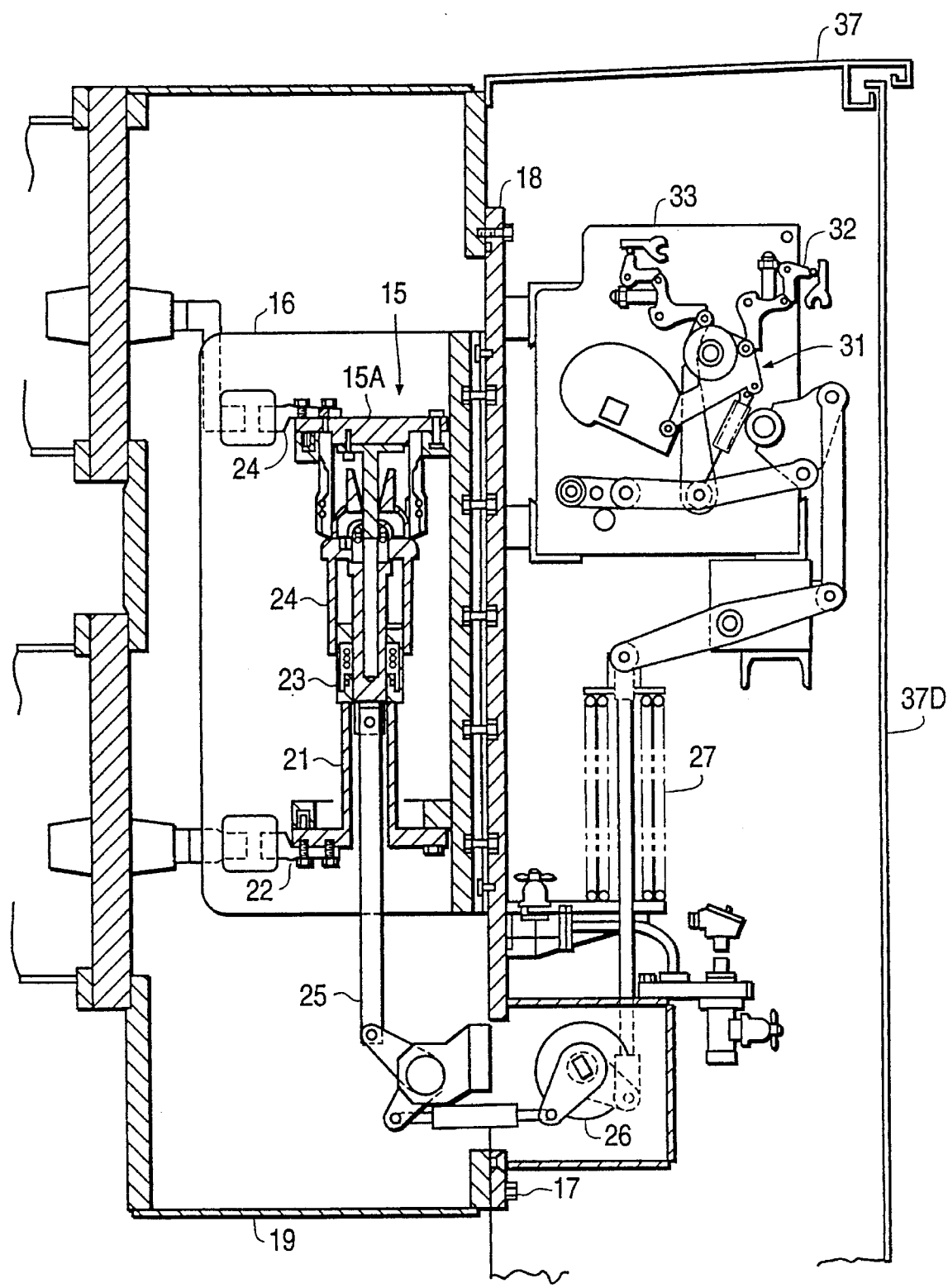
FIG. 9 is a cross-sectional view taken along the line IX—IX in FIG. 7.

The conductor is attached to the fixed contact 15A of the interrupting portion 15 as shown in FIG. 9. The conductor 22 is attached to the support 21 at a movable side of the interrupting portion 15. The puffer piston 23 is fixed to the supporter 21. A puffer cylinder 24 is connected to an operating apparatus system at an air side through an insulating operation rod 25 and a sealed portion of a rotary lever 26. In the operating apparatus system, a tripping spring 27, a closing spring 28 and an oil dash pot 29, utilized for braking at an end of a tripping and closing operation, are arranged at an air side of the fitting plate 18 in parallel with the interrupting portion 15. The tripping spring 27, the closing spring 28 and the oil dash pot 29 form three components of the driving system and are respectively arranged in parallel. The closing spring 28, wound into a compressed condition by an electric motor 30 and associated gears, is maintained in position by a projecting portion 32 through a linking system 31. When the projecting portion 32, shown in FIG. 9, declutches or is displaced by the linking system 31, a spring force of the closing spring 28 is released and the puffer cylinder 24 is pushed in a connecting direction through the linking system 31. In order to compress the tripping spring 27 by the spring force of the closing spring 28 at a closing operation, the spring force of the closing spring is larger than a spring force of the tripping spring 27. In a tripping operation, a projection of a tripping member 33 shown in FIG. 9 declutches or is displaced, whereby the tripping spring 27 is released, and the puffer cylinder 24 is pushed in a tripping direction through the linking system 31.

Figure 8:
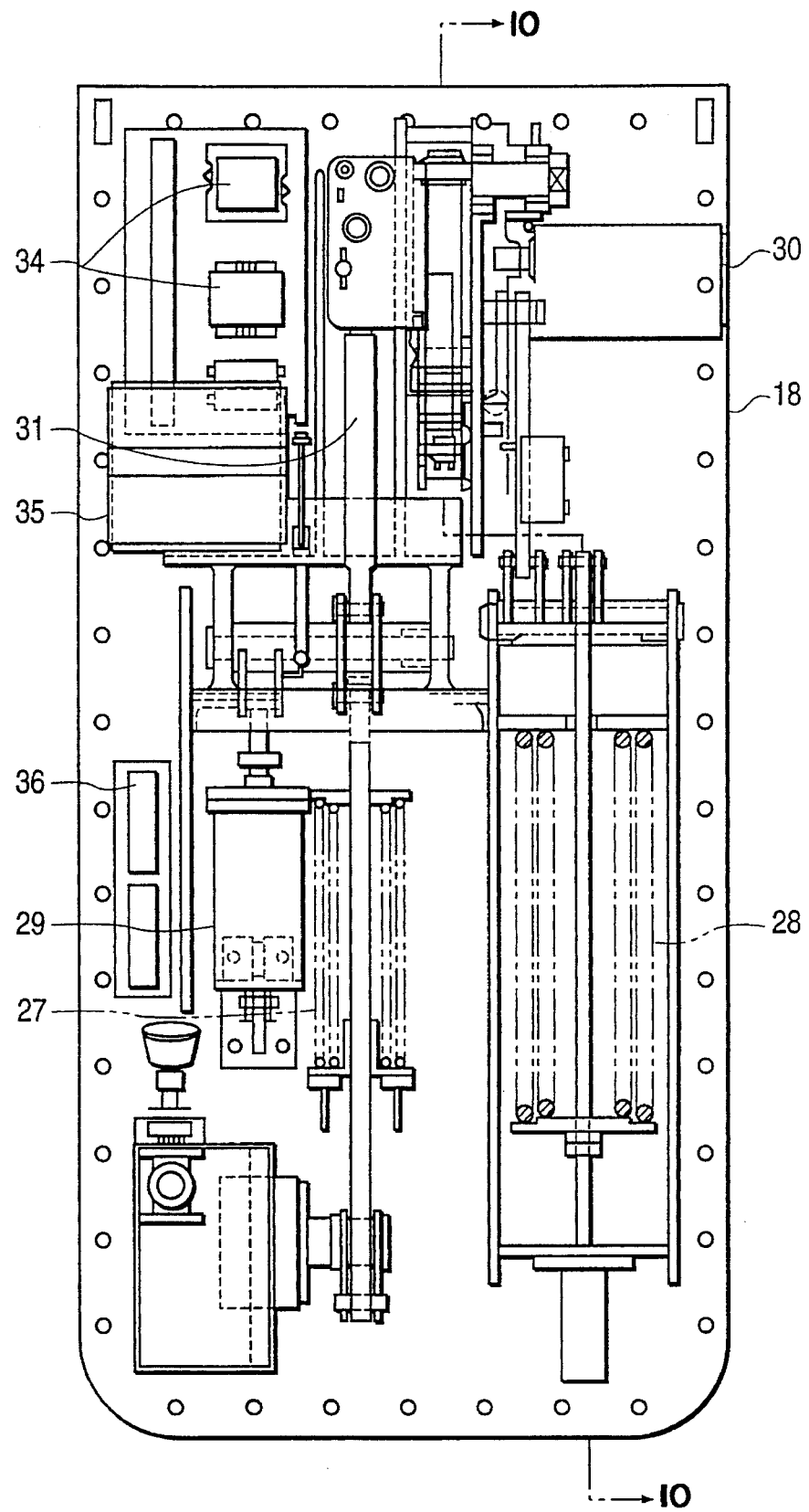
FIG. 8 is a view taken along the line VIII—VIII in FIG. 7.
Figure 10:
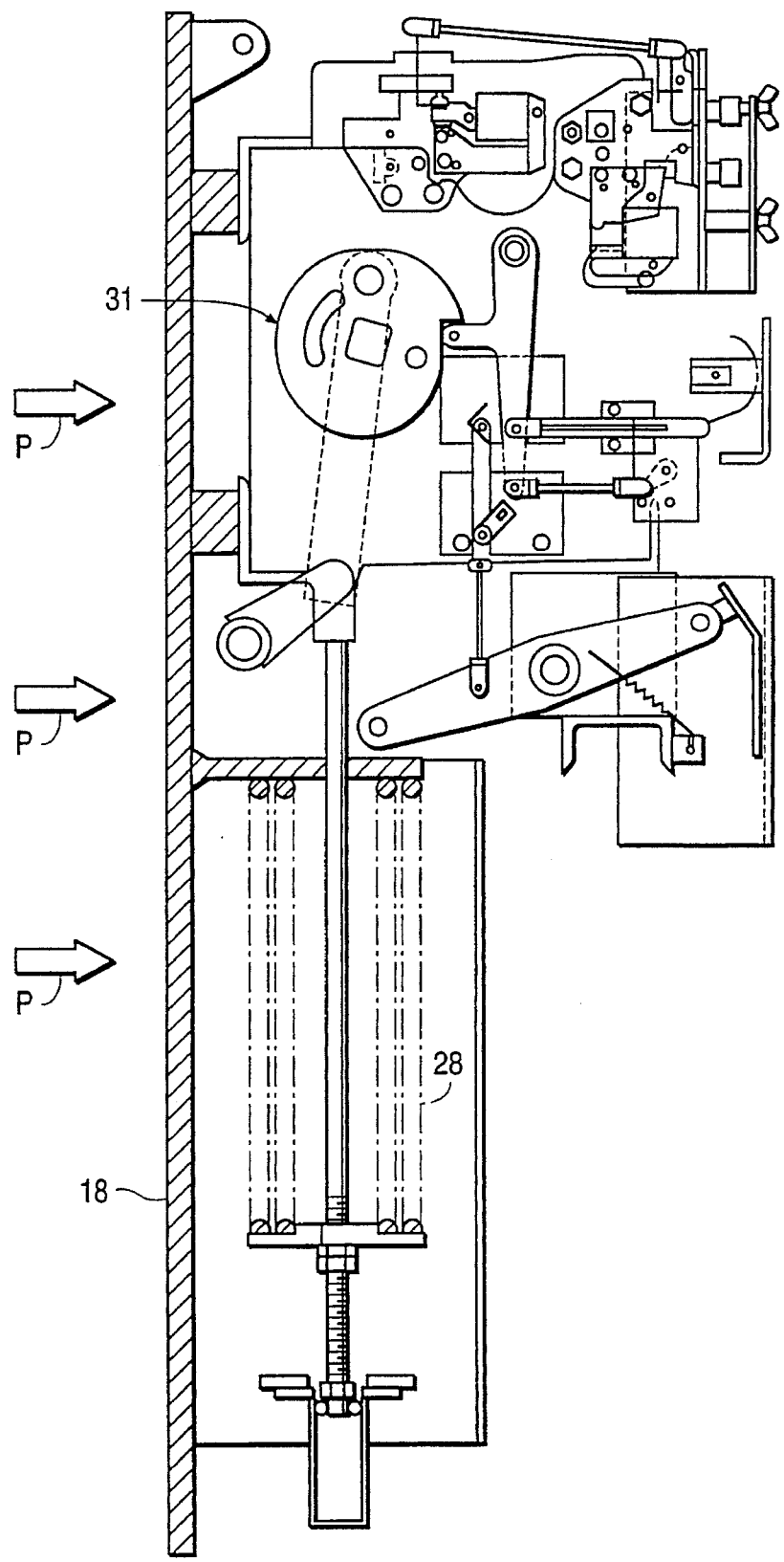
FIG. 10 is a cross-sectional view taken along the line X—X in FIGS. 7 and 8.

The fitting plate 18 is additionally furnished with, as shown in FIG. 8, a control relay 34, an auxiliary switch 35, a plug-in type terminal plate 36 and other conventional members necessary for enabling a circuit breaker operation. The closing spring 28, having a larger spring force than the spring force of the tripping spring 27, is fixed to the fitting plate 18 in parallel to a longitudinal direction of the fitting plate 18 as shown in FIGS. 8 and 10 and also in a direction which cancels a deformation of the fitting plate 18 by internal pressure P (FIG. 10) of the insulating compressed gas filling the sealed vessel 19.

The operating apparatus at the air side is installed in a box shaped cubical 37, and, accordingly, maintenance and inspection of the operating apparatus can be performed by opening front doors 37D (FIGS. 9,11) of the cubical 37, and an inspection or an exchange of the interrupting portion 15 and withdrawal of the integrated circuit breaker itself can be performed by withdrawing the fitting plate 18 without transferring and disassembling other members forming the gas insulating switch gear with the exception of an unplugging of the plug-in type terminal plate 36 (FIG. 8).

As described above, the circuit breakers require no space for inspection at the sides or back side of the circuit breakers and, accordingly, receiving and connecting portions of the transformer can be installed in parallel panels.

In the receiving and transforming apparatus described above, the interrupting portion 15 of one of the second circuit breakers 3 at the receiving side is usually kept open and in a waiting or stand-by state. Accordingly, supply power from electric power companies through other lines are supplied to the instrument potential and current transformer 1 through the receiving portion 5. Then, after measuring the power usage by the instrument potential and current transformer 1, the power is supplied to the power transformer 10 through the first circuit breakers 2. Under the above described conditions, when one of the power transformers 10 becomes disabled, for example, the interrupting portion 15 of the first circuit breaker 2 at the primary side is opened, power supplied to one of the power transformers 10 is stopped, and power supplied to the other power transformer 10 continues. Consequently, a disruption in power supply to all of the customers of the power company can be prevented, and the effect of the disruption can be restricted to a minimum degree.

In accordance with the present invention, width and depth of the apparatus can be dimensioned within a transportation limit size even though the respective first circuit breakers at the primary side of the power transformer are installed and integrated, and, accordingly, transportation by a truck or trailer without disassembly is possible. Thus, it is unnecessary to construct an installation pit and the installation time of the apparatus can be remarkably reduced.

Figure 11:
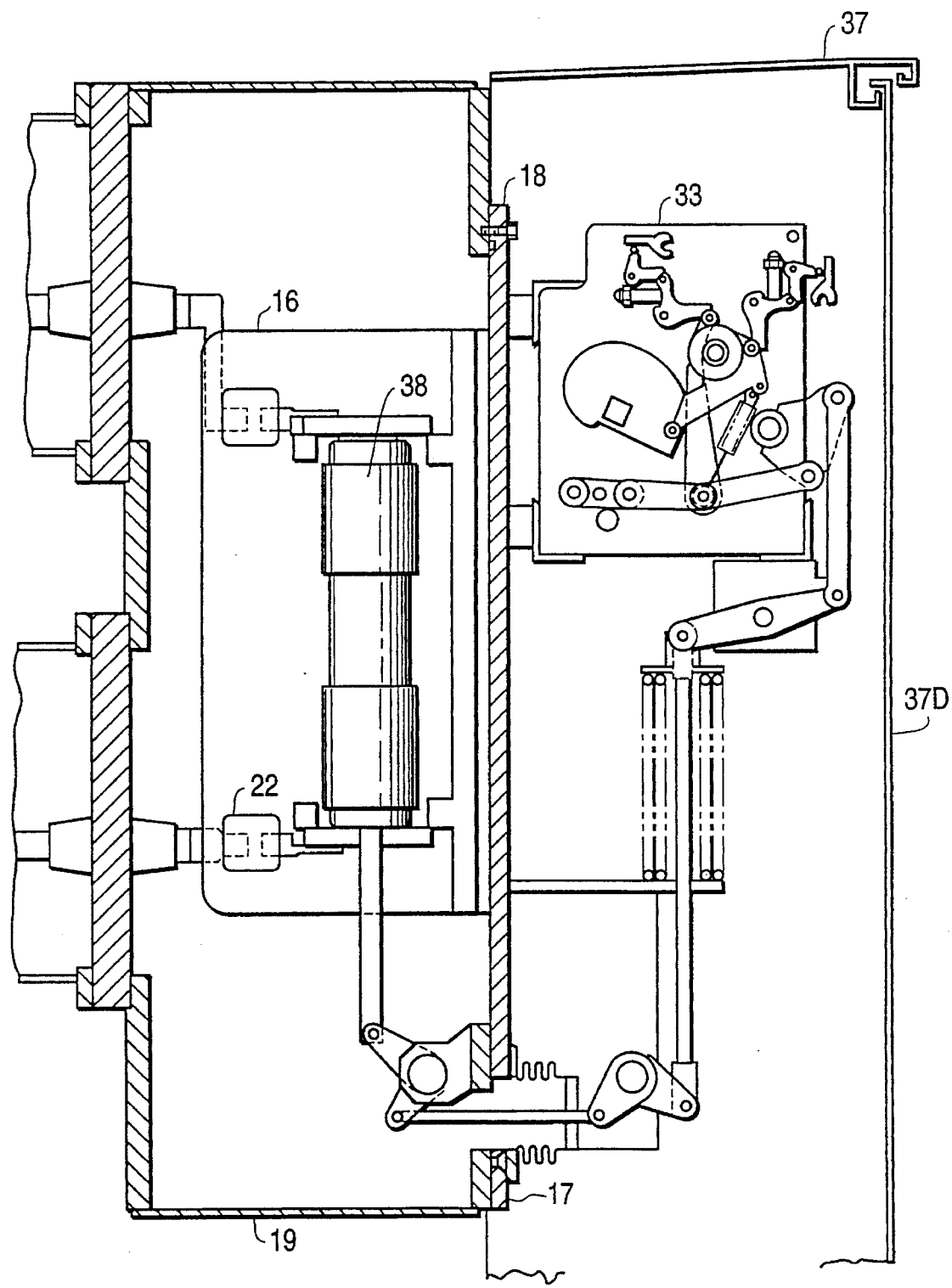
FIG. 11 is a vertical cross sectional view of another embodiment of a breaker employed in the apparatus of the present invention.

The interrupting portions 15 of the circuit breakers 2, 3 include a puffer type interrupting portion, but the interrupting portion may also include a vacuum type interrupting portion 38 as shown in FIG. 11. The same advantages as in the previously described embodiment can be obtained with a vacuum type interrupting portion.

Figure 12:
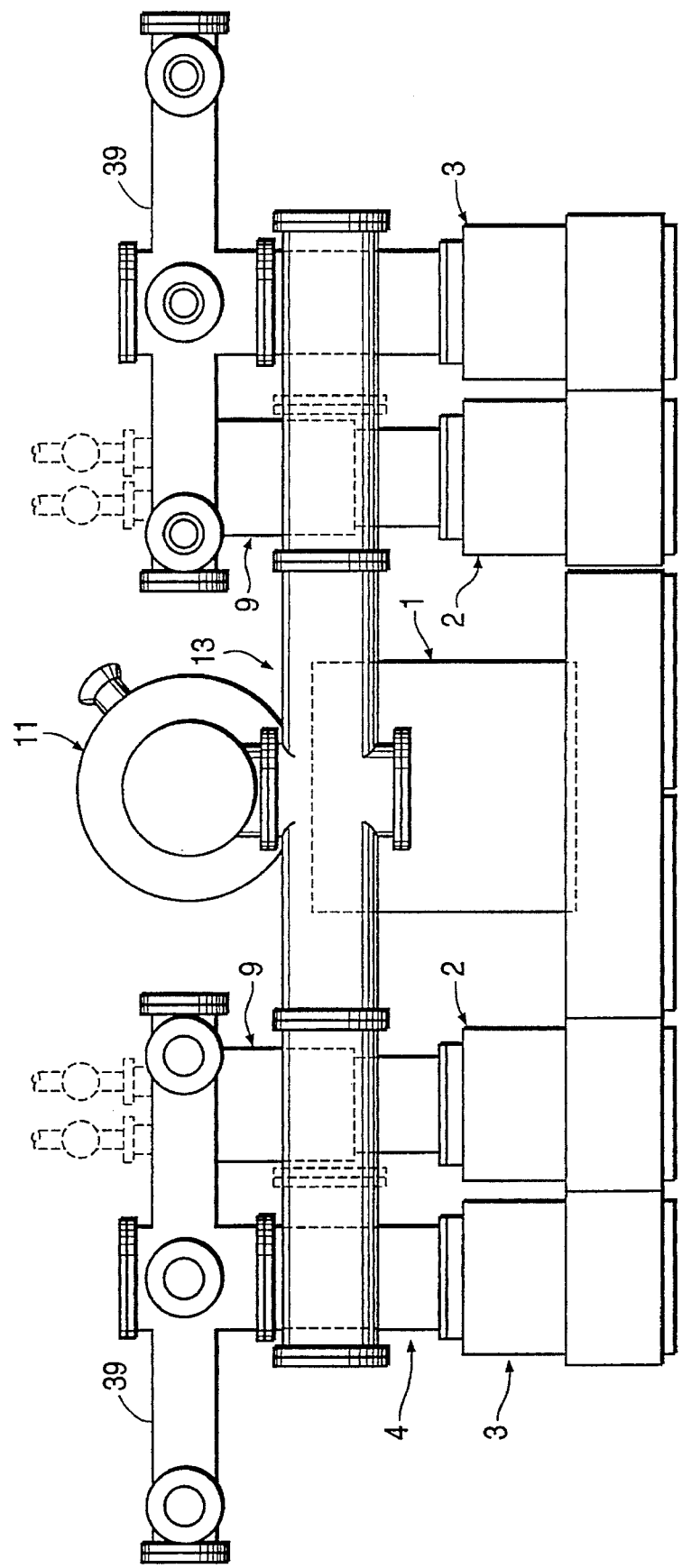
FIG. 12 is a plant view of a further embodiment of the apparatus of the present invention.
Figure 13:
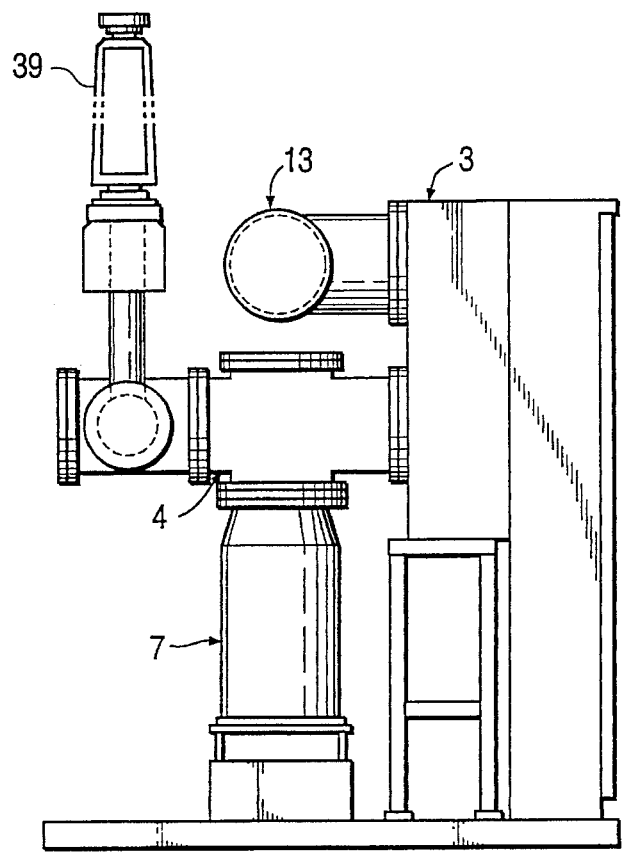
FIG. 13 is a left side view of the apparatus of FIG. 12.

The receiving portion may be a cable receiving portion, but the receiving portion may also be a receiving portion using a bushing 39 as shown in FIGS. 12 and 13. With the above described construction, the same advantages as are obtained in the previously described embodiments can be obtained, and the receiving portions 5 may be arranged at sides of the apparatus as viewed in a width direction, with the necessary distances between the phases being maintained even if the bushing 39 are in air. Moreover, changing and standardization of power receiving can be easily performed because changing of component equipment is unnecessary except when changing a portion including a vessel at a service entrance portion for fitting the bushings.

Figure 15:
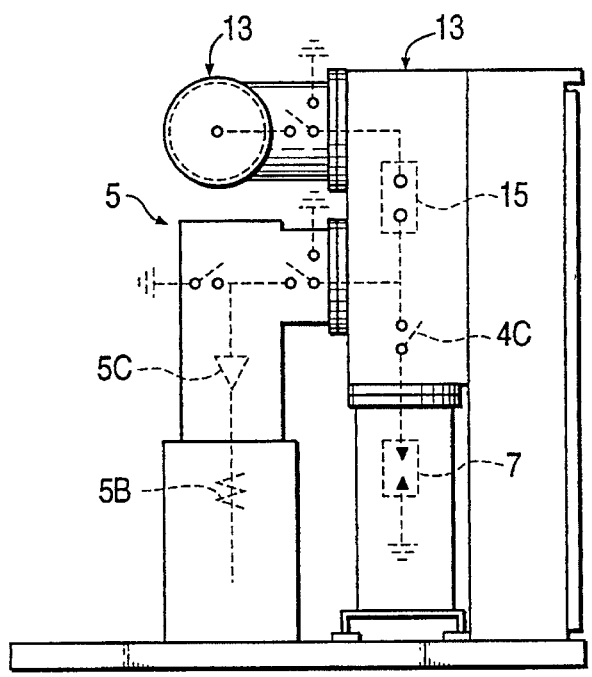
FIG. 15 is a left side view of the apparatus of FIG. 15.
Figure 14:
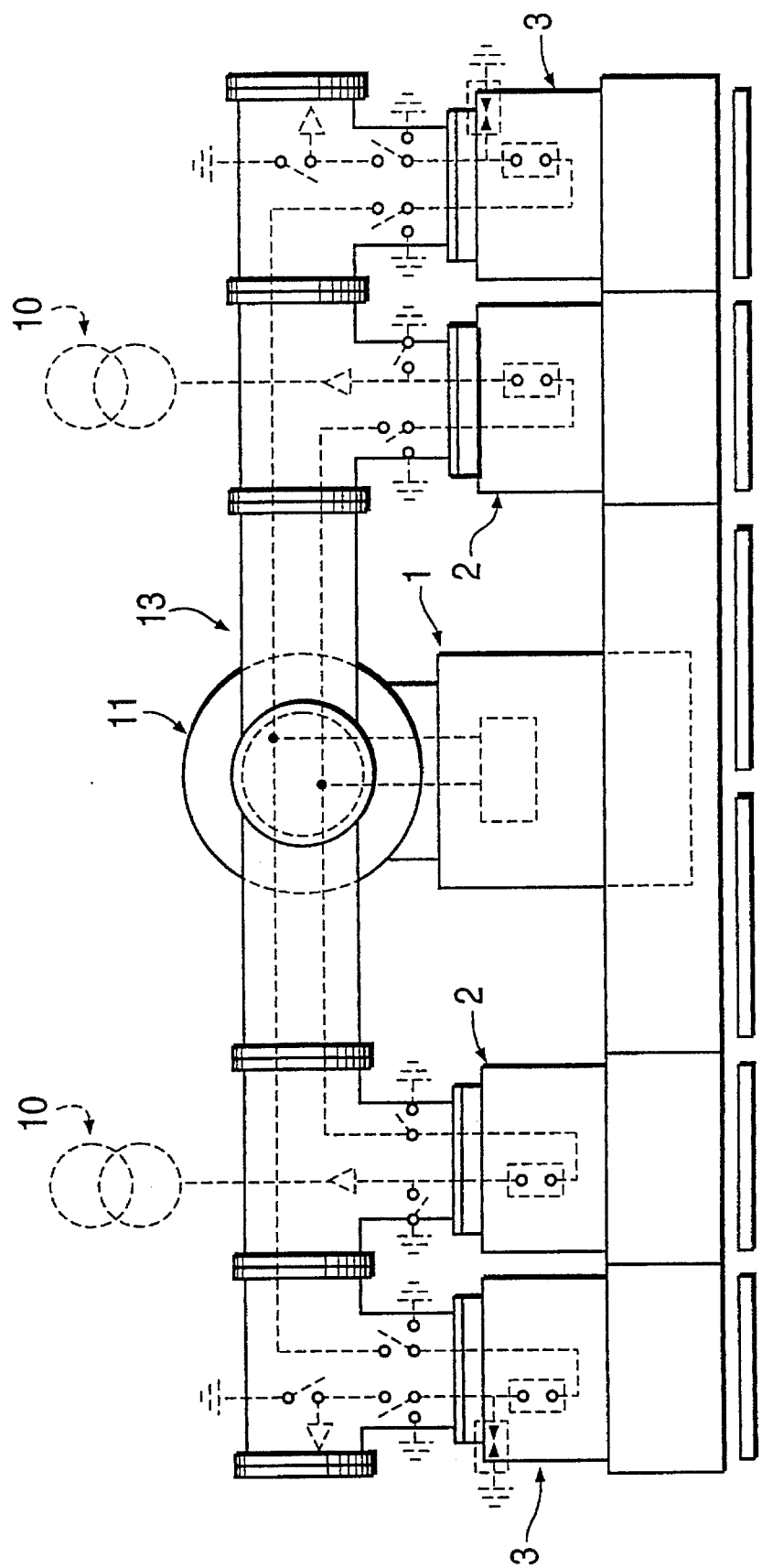
FIG. 14 is a plan view of a still further embodiment of the present invention.
Figure 18:
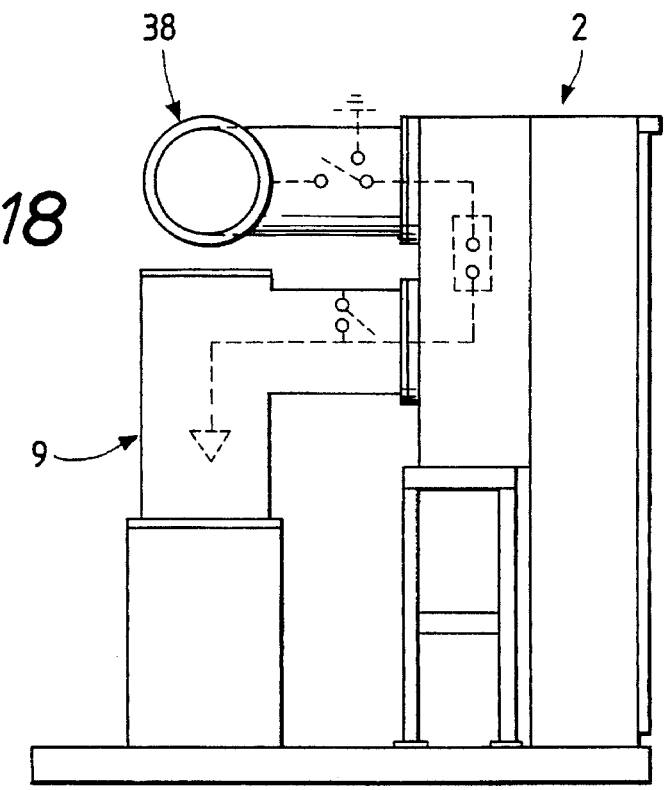
FIG. 18 is a view taken along the line XVIII—XVIII in FIG. 16.
Figure 19:
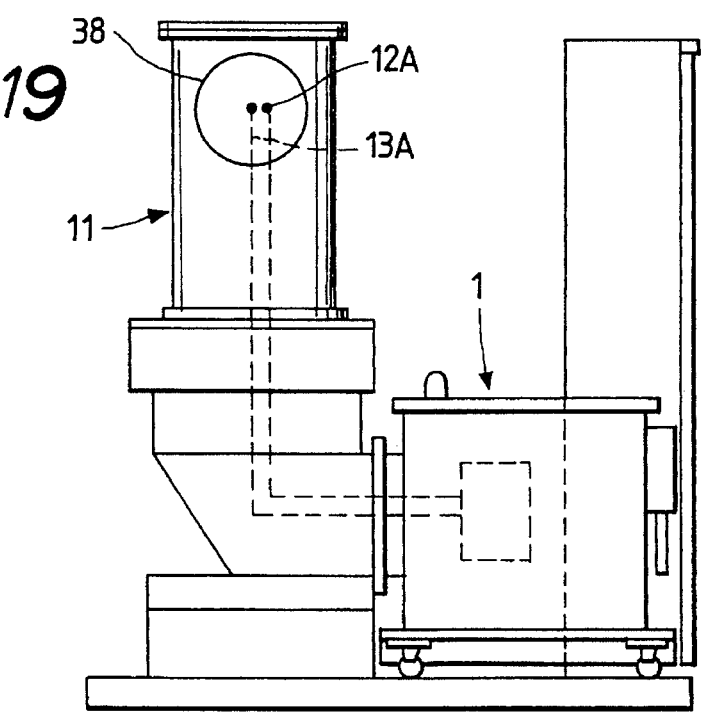
FIG. 19 is a view taken along the line XIX—XIX in FIG. 16.

FIGS. 14 and 15 illustrate another embodiment of the receiving and transforming apparatus of the present invention, wherein the arrestor 7 is installed under the second circuit breaker 3.

By virtue of the above noted installation of the arrestor 7, the depth dimension of the apparatus can be further reduced.

As a result, the installation area can be reduced. Moreover, the apparatus can readily be utilized in deep underground transforming stations which necessarily have restrictions as to the size of the installation area. In this case, arrestors at the service entrance portion become unnecessary because of the provision of a cable type service entrance.

FIGS. 16–19 illustrate yet another embodiment of a receiving and transforming apparatus of the present invention, wherein the duct line connecting portions 12, 13 (FIG. 6) are integrated into a single duct line connecting portion 68, with conductors 12A, 13A (FIG. 5) both being disposed in the duct line connecting portion 68. By constructing the apparatus in the above described manner, the same advantages as in the previously described embodiments can be obtained, and the number of components and weight of the apparatus can be reduced.

In accordance with the present invention, maintenance and inspection operations can be performed at a front planar area since the interrupting portion and operating apparatus of the circuit breaker are contained in a box shaped cubical. Moreover, space is required for maintenance operation which have conventionally been furnished at both sides of the circuit breaker are unnecessary. Furthermore, since the power receiving portion and the connecting portion to the power transformers are installed at the back side of each of the circuit breakers arranged in parallel panels, the width dimension of the apparatus can be reduced. By providing a box shaped vessel or cubical for the circuit breakers, the depth dimension of the apparatus can be reduced. Accordingly, transportation of the apparatus without disassembly is possible since the size of the apparatus can be dimensioned within transportation limit dimensions, and the installation period can be remarkably reduced since it is unnecessary to construct an installation pit.

In accordance with the present invention, a 2 line 1MOF 2 bank type receiving and transforming apparatus having high reliability in power supply can be provided, with the apparatus being capable of being transported without disassembly, and with pit construction for installation of the apparatus being unnecessary whereby the installation period for the apparatus can be remarkably decreased.

While we have shown and described several embodiments in accordance with the present invention, it is understood that the same is not limited thereto but is susceptible to numerous changes and modifications as known to one of ordinary skill in the art, and we therefore do not wish to be limited to the details shown and described herein, but intend to cover all such modifications as are encompassed by the scope of the appended claims.

We claim:

1. A receiving and transforming apparatus for receiving power from two power lines through at least one set of instrument potential and current transformers, wherein first switching means and a primary side of power transformers are arranged at respective sides of said instrument potential and current transformers, second switching means at a receiving side are respectively arranged at outer sides of the respective first switching means, the first and second switching means along with receiving portions, connecting portions to the power transformers, and the instrument potential and current transformers are connected by a duct line connecting portion at a back side of said first and second switching means, said first and second switching means respectively include interrupting portions and operating members, the interrupting portions are accommodated in box-shaped cubicles, and wherein the box-shaped cubicles are arranged in parallel so as to enable the interrupting to be accessible from a front portion of the box-shaped cubicles.

2. A receiving and transforming apparatus as claimed in claim 1, wherein said first and second switching means respectively include interrupting portions and operating members, wherein the interrupting portions are accommodated in the box-shaped cubicles, and wherein the cubicles are arranged in parallel so as to be accessible from a front portion thereof.

3. A receiving and transforming apparatus as claimed in claim 1, wherein doors are provided at a front portion of said box-shaped cubicles for enabling a withdrawal of the instrument potential and current transformers through the front portion of said box-shaped cubicles.

4. A receiving and transporting apparatus as claimed in claim 1, wherein said first and second switching means each include an interrupting portion and operating member, the interrupting portions are respectively accommodated in box-shaped cubicles, and wherein doors for enabling a withdrawal of the instrument potential and current transformer are provided at a front portion of said box-shaped cubicles.

5. A receiving and transforming apparatus for receiving power from two power lines through instrument potential and current transformers, wherein first switching means and a primary side of power transformers are arranged at respective sides of said instrument potential and current transformers, second switching means at a receiving side are respectively arranged at outer sides of the first switching means, connecting portions to the power transformers are arranged at a back side of said first switching means, receiving portions are arranged at a backside of said second switching means, wherein conductors for respectively connecting said first and second switching means at a backside of said instrument potential and current transformers are accommodated in a duct line connecting portion, and wherein said first and second switching means respectively include interrupting portions and operating members, the interrupting portion and the operating members are accommodated in box-shaped cubicles, and wherein the box-shaped cubicles are arranged in parallel so as to receive said operating members from a front portion thereof.

6. A receiving and transforming apparatus for receiving power from two power lines through instrument potential and current transformers, comprising:

first switching means respectively arranged at both sides of said instrument potential and current transformers for switching between said instrument potential and current transformers and a primary side of power transformers, second switching means respectively arranged at outer sides of the respective first switching means for switching between a receiving side and said instrument potential and current transformers, and duct line connecting portions arranged at a back side of said switching means for connecting said first switching means and a primary connection portion of said power transformers, said second switching means and a receiving portion, and said first and second switching means and said instrument potential and current transformers, and said first and second switching means respectively include interrupting portions and operating members, the interrupting portions and the operating members are accommodated in box-shaped cubicles, and wherein the box-shaped cubicles are arranged in parallel so as to receive said operating members from front portion thereof.

7. A receiving and transporting apparatus as claimed in claim 1, wherein said first switching means include disconnectors and said second switching means include circuit breakers.

8. A receiving and transporting apparatus as claimed in claim 2, wherein said first switching means include disconnectors and said second switching means include circuit breakers.

9. A receiving and transporting apparatus as claimed in claim 3, wherein said first switching means include disconnectors and said second switching means include circuit breakers.

10. A receiving and transporting apparatus as claimed in claim 4, wherein said first switching means include disconnectors and said second switching means include circuit breakers.

11. A receiving and transporting apparatus as claimed in claim 5, wherein said first switching means include disconnectors and said second switching means include circuit breakers.

12. A receiving and transporting apparatus as claimed in claim 6, wherein said first switching means include disconnectors and said second switching means include circuit breakers.

13. A receiving and transporting apparatus as claimed in claim 1, wherein said first switching means include disconnectors and said second switching means include circuit breakers and disconnectors.

14. A receiving and transporting apparatus as claimed in claim 2, wherein said first switching means include disconnectors and said second switching means include circuit breakers and disconnectors.

15. A receiving and transporting apparatus as claimed in claim 3, wherein said first switching means include disconnectors and said second switching means include circuit breakers and disconnectors.

16. A receiving and transporting apparatus as claimed in claim 4, wherein said first switching means include disconnectors and said second switching means include circuit breakers and disconnectors.

17. A receiving and transporting apparatus as claimed in claim 5, wherein said first switching means include disconnectors and said second switching means include circuit breakers and disconnectors.

18. A receiving and transporting apparatus as claimed in claim 6, wherein said first switching means include disconnectors and said second switching means include circuit breakers and disconnectors.

* * * * *